G. W. YOUNG.
AUTOMOBILE BED.
APPLICATION FILED MAY 19, 1919.

1,345,820. Patented July 6, 1920.
2 SHEETS—SHEET 1.

Inventor
GEORGE W. YOUNG

By Reynolds A Cook
Attorney

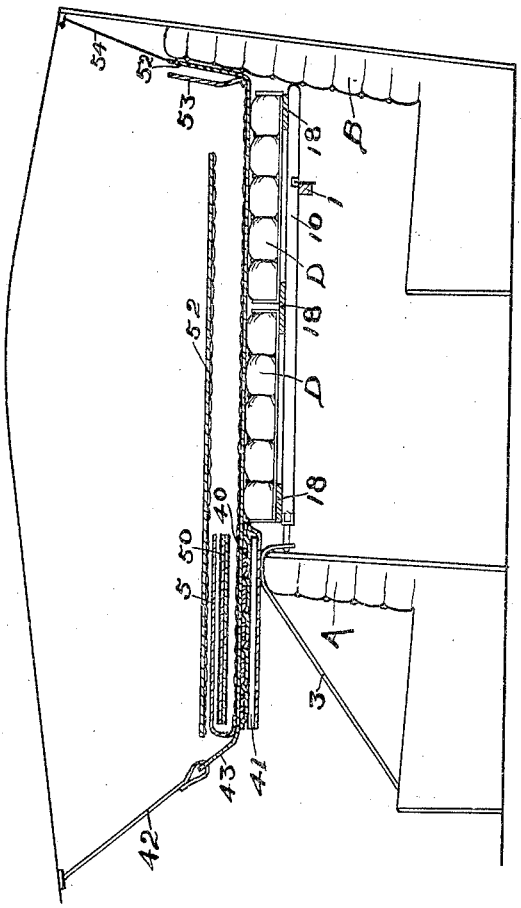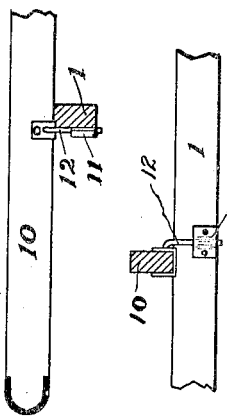

UNITED STATES PATENT OFFICE.

GEORGE W. YOUNG, OF SEATTLE, WASHINGTON.

AUTOMOBILE-BED.

1,345,820.

Specification of Letters Patent.

Patented July 6, 1920.

Application filed May 19, 1919. Serial No. 298,245.

*To all whom it may concern:*

Be it known that I, GEORGE W. YOUNG, a citizen of the United States, and resident of the city of Seattle, county of King, State of Washington, have invented certain new and useful Improvements in Automobile-Beds, of which the following is a specification.

My invention relates to the construction of devices adapted for use in connection with automobiles whereby a bed may be provided in an ordinary automobile.

One object of this invention is to provide a construction of the bed such that all of the parts which must be provided in addition to the ordinary equipment of an automobile, may be reduced to as small a space as is possible and yet secure satisfactory results. The particular parts which form my invention and upon which I desire patent protection will first be described hereinafter and then particularly pointed out in the claims.

In the accompanying drawings I have shown my invention embodied in the form of construction which I now prefer to use.

Fig. 3 is a longitudinal sectional elevation of the bed parts showing their relation to the seats of the automobile.

Fig. 4 is a side view showing in detail the manner of supporting the transversely extending bar.

Fig. 5 is a side view or face view of the member whereby the ends of this transverse bar is supported.

Figs. 6, 7 and 8 are different views of one end of one of the supporting bars showing the extension bar by which its length may be adjusted.

Figs. 9 and 10 show the manner of securing the transverse and the longitudinal bars and hold them in proper position with relation to each other.

Figure 1:
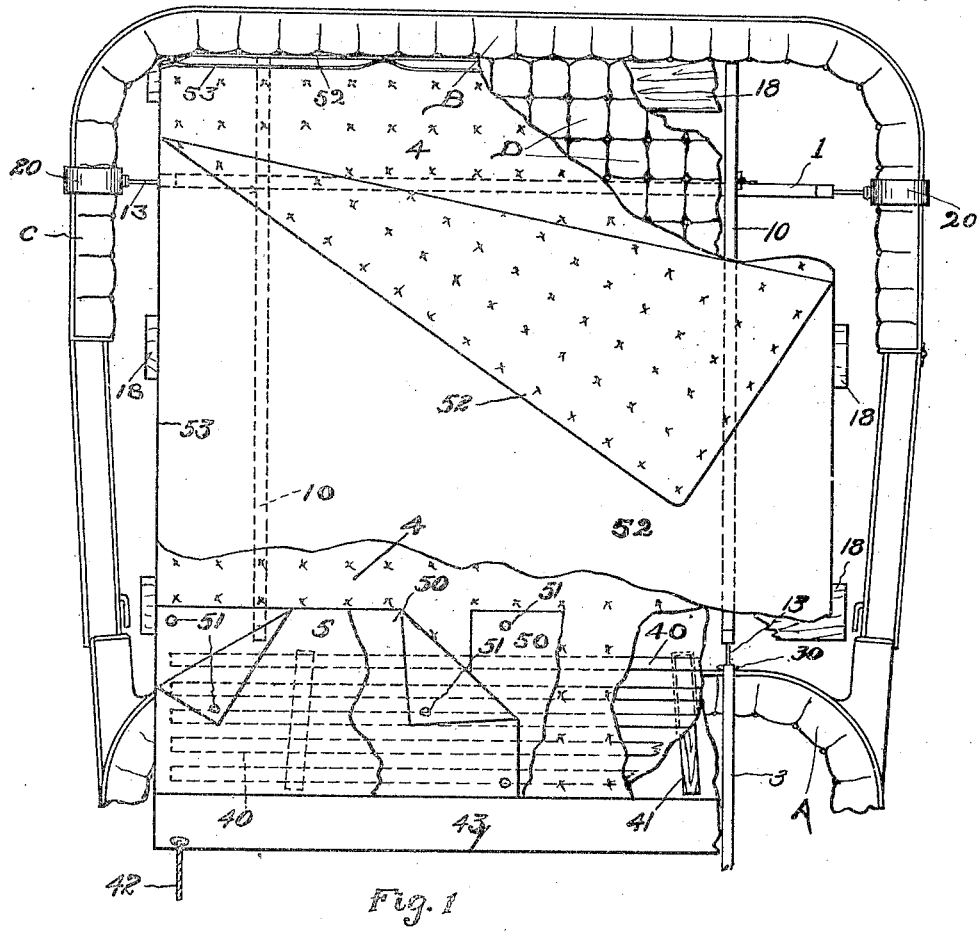
Figure 1 is a top plan view of the major part of an automobile body illustrating the appearance of the bed when in use.
Figure 2:
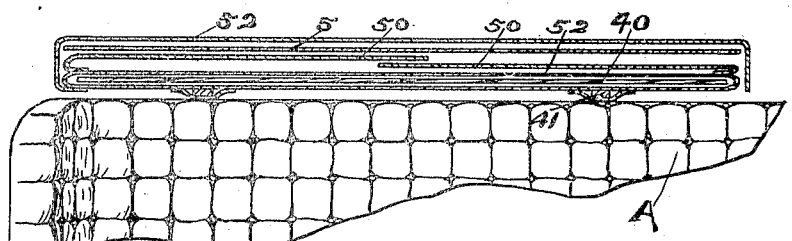
Fig. 2 is a transverse sectional elevation taken through that part of my device which projects over the front seat of the automobile.

My invention employs a transversely extending supporting bar 1 which is supported in a position extending transversely across the car within the sides thereof, and above the position occupied by the rear seats. This is preferably a little in front of the back B of the automobile. Two other bars 10 which are similar in general construction are employed. These bars 10 extend lengthwise of the car or from front to rear, and are located somewhat inwardly from the sides of the car. One of these bars, as the bar 1, is provided with a socket 11 which is adapted to receive a pin 12 carried by the bar 10. As herein shown, the pin 12 is supported upon the bar 10 in such a manner that it may swing up alongside of the bar and thus be gotten out of the way for packing. By this means the two bars are held in exact relationship to each other when assembled.

In view of the fact that the space between the sides of the car and between the back seat and the back of the front seat varies, it is necessary to provide means for adjusting the effective length of the bars 1 and 10. The means adopted for securing this result has been clearly shown in Figs. 6, 7 and 8. This means has been provided at each end of the transversely extending bar 1 and at the forward end of the bars 10. The bars 1 and 10 are provided with a longitudinally extending slot in which is placed a metal bar 13. This bar at its outer end is provided with a notch 14, extending inward from one side and close to the end thereof. To reinforce the bar 1, which ordinarily would be made of wood, its head is provided with a clip or ferrule 15, which has a hole therein permitting free sliding movement of the extension bar 13. To prevent outward movement of the bar 13 beyond the desired point, it may be provided with a stop, as 16, which engages with any convenient inner surface of a ferrule 15. The slot containing the bar 13 may be closed at the side edge of the bar 1 by means of a plate 17. By this means the effective length of the bars may be adjusted within a certain range.

The means for supporting the ends of the bar 1 which I have provided, consists of a bar 2 which has at its upper end a curved plate 20 which is preferably made of rather large width and which is of a size to fit over and be supported upon the upper edge of the side C of the automobile body. The shank 2 is provided with a series of holes 21 spaced along its length and adapted to receive the ends of the extension bars 13. The slot 14 in such extension bar is adapted to receive the body of the shank 2 and thus hold the bar in place. By providing a series of holes 21 the vertical position of the bar 1 may be adjusted.

The forward ends of the bars 10 are supported through the means of straps, as 3, which extend over the top of the front seat back and is provided with a ring 30, which extends into the slot 14 in the extension bar 13. The strap 3 may be secured to some part of the automobile body in any convenient manner.

Upon the longitudinally extending bars 10, boards 18 are placed and upon these the cushions D of the automobile are placed. The elevation of the bars 10 should be such that the top surface of the cushion will be, when put in place, about level with, or slightly above, the upper edge of the back A of the front seat. The bed proper which I place upon the supporting parts before described consists of the following parts:

The bottom section 4 is made of suitable length and of a width to extend across the automobile. This may be provided with stuffing or padding material as desired. The length required would ordinarily be such as to require that the foot end extend over the front seat. In this part of the bed a series of transversely extending slats 40 are employed, which slats are secured in position in the material of which the bed is made. These slats will be made of thin strips of wood and would not interfere with rolling up the bed.

Associated with these slats are two or more bars 41 which are also comparatively light in weight and which extend transversely beneath all of the slats 40. They thus serve to hold these transverse slats 40 in suitable position while the bed is in use. These bars 41 are placed in pockets provided in the fabric which composes the bed bottom and in such a manner that they may be taken out when it is desired to roll up the bed.

To support the overhanging foot portion of the bed, I attach thereto cords or straps 42 which may be extended upward and secured to a bar which forms a part of the automobile top, as the weight carried by this foot portion of the bed would never be very much and the strain put upon these parts would be slight. As illustrated, these cords or straps 42 are shown as attached to a narrow flap 43 which is secured along the foot end of the bed. The number of these supporting straps 42 may be made anything desired.

Secured to the foot of the bed bottom is a flap 5 which folds over the foot of the bed and forwardly. Secured to each side edge of this bed bottom and extending from the foot end a short distance toward the head end, are other flaps 50 which extend a little beyond the center of the bed and are provided with means, as socket fasteners 51, so that they may be secured together when they are folded over upon the bed. The large flap 5 is secured along the foot end of the bed bottom and may also be provided with fasteners 51 so that it may be secured in position when folded over. By this means the foot portion of the bed is closed in so as to keep the feet of the occupants warm.

Secured to one side of the bed bottom 4, as the side 53, is the cover section 52. This may be made of any kind of construction desired and, for instance, it may be padded and given an outer cover of canvas or any material desired. This is of such size as to fold over the entire bed and to provide cover for the occupant. Associated with this any other bedding desired may be employed.

At the head end of the cover section is a flap 52 which may be secured in raised position, as by a cord 54. A second layer of material 53 is coextensive with this flap and may be stitched thereto at intervals so as to form a series of pockets in which may be placed clothing or any articles which it is desired to carry in the bed or to store while the occupants are in the bed.

In use the main portion of the bed is supported upon the bars 1 and 10 and the boards 18 carried thereby. The foot portion which extends over the front seat is supported through the straps 42 from the auto top. When not in use the parts composing the bed may all be rolled into a compact bundle which does not take up any excessive amount of space. When assembled as described, it forms a comfortable bed and under a rain proof top. The sides of the automobile may be closed, thus forming a very comfortable sleeping compartment.

What I claim as my invention is:

1. An automobile bed supporting mechanism comprising a bar adapted to extend across the automobile body above the rear seat, suspension bars having each an arm embracing the upper edge of the automobile side, means for removably securing the ends of said cross bar to said suspension bars, two beams extending lengthwise the car and supported at their rear end by respectively opposite ends of said cross bar, adjustable extensions at the forward ends of said beams, means connected with said extensions for supporting the forward ends of said beams from the back of the front seat, and flooring-members carried by said beams.

2. In an automobile bed supporting device, a cross bar adapted to extend across the automobile body above the rear seat and provided at each end with an extendible member having an end hook, suspension bars having hooked ends adapted to embrace the upper edges of the automobile sides and having shanks provided with holes adapted to receive the hooks of the extension members, longitudinal bars having one end supported by said cross bar, and having extendible members telescoping therewith at their forward ends, and straps adapted to be connected with the extension members of each longitudinal bar to support the same from the back of the front seat.

3. An automobile bed support comprising a cross bar adapted to extend crosswise within the body and above the rear seat, extension bars carried by the ends of said cross bar and adjustable to accommodate for different lengths, suspension bars adapted to have supporting engagement with the top of the car side, said suspension bars and the extension bars being adapted to be secured together and adjustable for relative height, longitudinal bars adapted to be placed upon said cross bar and having extendible sections telescoping therewith at their forward ends, the two having engaging positioning members, straps engageable with the extendible sections of the longitudinal bars and extending over the back of the front seat, said bars being adapted to support the car cushions, and a bed adapted to be placed upon said cushions and extending over the front seat, said extending part of the bed having removable stiffening bars therein, and means for supporting said extension.

4. An automobile bed comprising supporting members adapted to extend over the space between the front and rear seats of the automobile and to support the automobile cushions, a bed adapted to cover and be supported by said structure, said bed having an overhanging foot portion extending forwardly of the front seat back, said overhanging portion having stiffening bars extending transversely of the car and removable supporting bars extending transversely of the stiffening bars and separate means for supporting the outer edge of said overhanging foot portion of the bed.

5. An automobile bed comprising a bottom section having transversely extending stiffening bars secured thereto within a belt at its foot end, pockets extending transversely of said bars, and stiffening bars adapted to be removably inserted in said pockets.

6. An automobile bed comprising a supporting frame extending between the backs of the front and rear seats of the automobile and to support the seat cushions at the level of the front seat back, a bed bottom adapted to cover said space and to extend forwardly over the front seat, transversely extending stiffening slats secured to said forward extension, pockets secured to said forward extension and extending transversely of said slats, bars adapted to be inserted in said pockets with one end resting upon the back of the front seat, and straps adapted to support the foot end of the bed bottom from the automobile top.

Signed at Seattle, Washington, this 10th day of May, 1919.

GEO. W. YOUNG.